United States Patent [19]
Deblandre et al.

[11] 3,888,818
[45] June 10, 1975

[54] THERMAL STABILIZATION OF VINYL RESINS WITH DERIVATIVES OF ALPHA-PHENYLINDOLE

[75] Inventors: Claude Deblandre, La Hulpe; Jean Guyaux, Brussels, both of Belgium

[73] Assignee: Solvay & Cie, Brussels, Belgium

[22] Filed: Sept. 7, 1973

[21] Appl. No.: 395,063

[30] Foreign Application Priority Data
Sept. 8, 1972  France .............................. 72.32076

[52] U.S. Cl. .......................... 260/45.8 N; 260/319.1
[51] Int. Cl. ........................................... C08f 45/60
[58] Field of Search .................... 260/45.8 N, 319.1

[56] References Cited
UNITED STATES PATENTS
2,476,422  7/1949  Leininger ................... 260/45.8 N X
3,755,248  8/1973  Shimosaka et al. ............. 260/458 N
3,781,279  12/1973  Crounse et al. ............... 260/319.1 X FOREIGN PATENTS OR APPLICATIONS
46-1,408  1/1971  Japan .............................. 260/319.1

Primary Examiner—V. P. Hoke
Attorney, Agent, or Firm—Larson, Taylor and Hinds

[57] ABSTRACT

Thermal stabilizers for vinyl resins. The compounds are derivatives of alpha-phenylindole and have the formula:

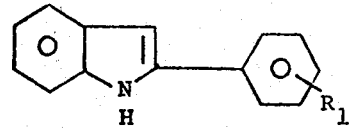

in which
$R_1$ is a linear or branched alkyl or a cycloalkyl radical containing from 4 to 20 carbon atoms.

Such compounds may be prepared by acetylation with the aid of a Friedel-Crafts catalyst benzene substituted by an alkyl or cycloalkyl chain, then reacting the resulting acetophenone with phenylhydrazine in order to form the corresponding phenylhydrazone, which undergoes transposition according to the so called Fischer reaction, in the presence of an acid catalyst.

6 Claims, No Drawings

THERMAL STABILIZATION OF VINYL RESINS WITH DERIVATIVES OF ALPHA-PHENYLINDOLE

BACKGROUND OF THE INVENTION

The present invention relates to derivatives of alpha-phenylindole, a process for their production, and their utilization for the thermostabilization of compositions based on vinyl polymers.

Alpha-phenylindole is a well-known product. It is used in particular in the composition of stabilizing systems for arresting the degradation of vinyl resins through the effect of heat.

For this application alpha-phenylindole has a certain number of advantages: it is not toxic, it imparts to the resin a good thermostability and perfect initial coloration which is kept constant during the relatively short period of time necessary for processing the polymer; in addition, it imparts extended long-term stability to the latter.

Nevertheless, because of a sublimation temperature close to the processing temperature of the resinous compositions alpha-phenylindole gives rise to the formation of vapours which may condense on the cooled product, and in particular inside containers when the stabilized compositions are used for the production of hollow packings.

There is therefore a risk that alpha-phenylindole will be found in the packed products.

Furthermore, alpha-phenylindole is relatively soluble in aqueous medium and there is therefore a risk that it will migrate through solubilization into the packed products and impair their organoleptic properties.

It is an object of the invention to provide derivatives of alpha-phenylindole which, compared with alpha-phenylindole itself, are less soluble in water and have a higher sublimation temperature.

BRIEF SUMMARY OF THE INVENTION

The present invention accordingly relates to derivatives of alpha-phenylindole having the formula:

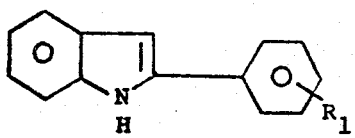

in which $R_1$ is a linear or branched alkyl or a cycloalkyl chain containing from 4 to 20 carbon atoms.

The position of the $R_1$ radical on the aromatic nuclei is not critical: it may be ortho, meta or para. However, the compounds wherein the radical $R_1$ is in the para position are preferred since they are easier to prepare.

Alpha(ortho, meta or para-n.butylphenyl)indoles, alpha(ortho, meta or para-n.pentylphenyl)indoles, alpha(para-tert.amylphenyl) indole, alpha(para-cyclohexylphenyl)indole, alpha(ortho, metal or para-n.octylphenyl)indoles, alpha(para-tert.octylphenyl)indole, alpha(para-tert.nonylphenyl)indole, alpha(para-dodecylphenyl)indole, alpha(para-tetradecylphenyl)indole, alpha(para-hexadecylphenyl) indole, alpha(para-octadecylphenyl)indole, may be cited among the various derivatives of alpha-phenylindole according to the present invention.

In order to prepare the alpha-phenylindole derivatives forming the object of the present invention, one simple process, among others, consists of the acetylation with the aid of a Friedel-Crafts catalyst of benzene substituted by an alkyl or cycloalkyl chain, then reacting the resulting acetophenone particularly the para substituted acetophenone with phenylhydrazine in order to form the corresponding phenylhydrazone, which undergoes transposition according to the so-called Fischer reaction, in the presence of an acid catalyst.

The synthesis reaction for the para derivative can be represented diagrammatically as follows:

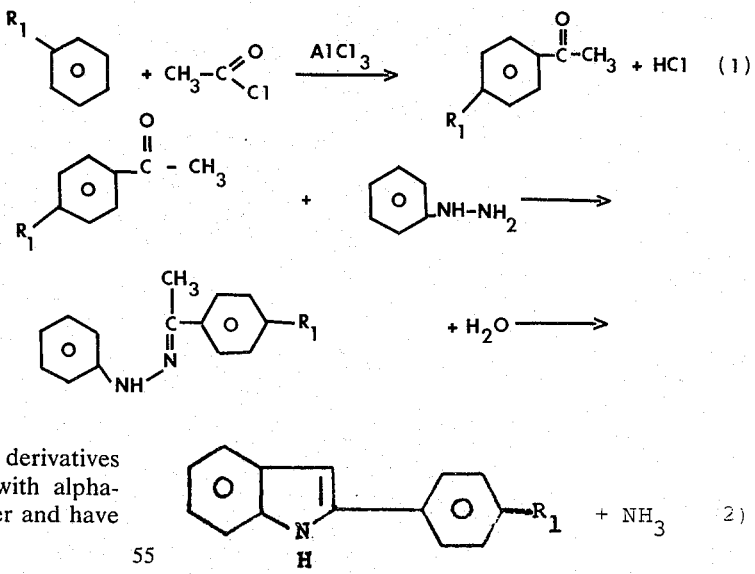

DETAILED DESCRIPTION

Various derivatives of alpha-phenylindole constituting the object of the invention have been prepared. For each of them there were determined their solubility in water and temperature of sublimation by thermogravimetry in a nitrogen atmosphere, and for purposes of identification a mass spectrum was produced.

The preparation and properties of these derivatives are described in the examples below.

EXAMPLE 1

650 ml $CCl_4$, 154 g $AlCl_3$ and, drop by drop with agitation and cooling by means of an ice bath, 88 g acetyl chloride are introduced in succession into a 2-litre flask. 190 g (1 mole) octylbenzene are then added drop by drop with agitation and ensuring that the temperature of the reaction medium does not exceed 5°C. When all the reactant has been added, the ice bath is removed and agitation is continued until the liberation of HCl ceases. The contents of the flask are then poured slowly and with agitation into slightly acidulated frozen demineralised water. The organic phase is separated by decantation and first washed with a 5 percent sodium carbonate solution in order to remove entrained HCl and then treated with demineralised water until the aqueous extracts are neutral. After evaporation of the solvent, the octylacetophenone obtained is distilled. About 180 g of product are collected, representing a yield of the order of 80 percent. This product contains the para isomer together with minor impurities.

40 g of polyphosphoric acid previously heated to about 60°C are added to a mixture of 23.2 g octylacetophenone and 10 ml phenylhydrazine. Vigorous agitation is effected until the temperature rises to 130° – 140°C. The mixture is cooled by a water bath. The temperature continues to rise to 190° – 220°C. The resulting product is then allowed to cool to about 100°C, whereupon water is added to it. The whole mixture is transferred to a decantation funnel, and extraction with ether is then effected. The ethereal phase is washed with water until the aqueous extracts are neutral. The ether is evaporated. The crude product obtained is recrystallised once from alcohol and then washed in petroleum ether at 100° – 120°C, finally being filtered and dried. 18 g of product are collected, representing a yield of about 60 percent of alpha(para-n octylphenyl)indole.

This product has a solubility in water lower than 0.01 mg/l at 20°C and a temperature of sublimation of 312°C. By way of comparison, alpha-phenylindole has a solubility in water of 0.97 mg/l at 20°C and a sublimation temperature of 237°C.

The mass spectrum of the product is distinguished by two main peaks at $m/e$ of 305 ($M^+C_{22}H_{27}N$) and 206($M^+$, $C_7H_{15}$, $C_{15}H_{12}N$) while the metastable transition (305 → 206) gives a peak at $m^*$ of about 139.1[$(206)^2/305$]. This spectrum corresponds to alpha(n octylphenyl)indole.

EXAMPLE 2

The operation is carried out under exactly the same conditions as in Example 1, but the starting octylbenzene is replaced by 1 mole, that is to say 160 g, of cyclohexylbenzene.

At the end of the test 13 g of product are obtained, which represents a yield of about 50 percent of alpha(para-cyclohexylphenyl) indole.

This product has a solubility in water lower than 0.01 mg/l at 20°C and a sublimation temperature of 313°C.

The mass spectrum is distinguished by two main peaks at $m/e$ of 275($M^+C_{20}H_{21}N$) and 232($M^+C_3H_7$, $C_{17}H_{14}N$), while the metastable transition (275 → 232) gives a peak at $m^*$ of about 195.7[$(232)^2/275$].

EXAMPLE 3

The operation is carried out under exactly the same conditions as in Example 1, but the starting octylbenzene is replaced by 1 mole, that is to say 246 g, of dodecylbenzene.

At the end of the test 21 g of product are collected, which represents a yield of about 60 percent of alpha(-para-dodecylphenyl)indole.

This product has a solubility in water lower than 0.01 mg/l at 20°C and a sublimation temperature of 342°C.

The mass spectrum is distinguished by two main peaks at m/e of 361($M^+C_{26}H_{35}N$) and 206($M^+C_{11}H_{23}$, $C_{15}H_{12}N$), while the metastable transition (361 → 206) gives a peak at $m^*$ of about 117.6[$(206)^2/361$].

EXAMPLE 4

The operation is carried out under exactly the same conditions as in Example 1, but the starting octylbenzene is replaced by 1 mole, that is to say 148 g, of tert-amylbenzene.

At the end of the test 14 g of product are collected, which represents a yield of about 55 percent of alpha(para-tert-amylphenyl) indole.

This product has a solubility in water lower than 0.01 mg/l at 20°C and a sublimation temperature of 279°C.

The mass spectrum is distinguished by two main peaks at ($m/e$) of 263($M^+C_{19}H_{21}N$) and 234($M^+C_2H_5$, $C_{17}H_{16}N$), while the metastable transition (263 → 234) gives a peak at $m^*$ of about 208.2 [$(234)^2/263$].

EXAMPLE 5

Under the same conditions as in Example 1, alpha (para-n butylphenyl)indole is prepared from n-butylbenzene.

This product has a solubility in water lower than 0.01 mg/l at 20°C and a sublimation temperature of 281°C.

The mass spectrum is distinguished by two main peaks at ($m/e$) of 249($M^+C_{18}H_{19}N$) and 206($M^+C_3H_7$, $C_{15}H_{12}N$), while the metastable transition (249 → 206) gives a peak at $m^*$ of about 170.4[$(206)^2/249$].

Among the possible applications of the derivatives of alpha-phenylindole forming the object of the present invention mention may in particular be made of the stabilisation of vinyl resins against degradation through the action of heat.

For this application it is preferable for the derivative of alpha-phenylindole used to have a sublimation temperature sufficiently higher than the processing temperature of the resin composition, which is generally between 190° and 220°C.

It is for this reason that the alpha-phenylindole derivatives forming the object of the present invention, that is to say derivatives in which the $R_1$ chain contain a total number of carbon atoms between 4 and 20, preferably between 8 and 16, are used. These compounds have in effect a sublimation temperature of at least 250°C and are in addition practically insoluble in water, thus substantially reducing the risk of migration into the aqueous product which comes into contact with manufactured products produced from the stabilized resin compositions.

The alpha-phenylindole derivatives are generally used in combination with other known stabilisers, among which mention may be made in particular of calcium and zinc soaps and organic derivatives of tin.

The position of the $R_1$ radical on the aromatic nuclei is not critical for this application. Pure compounds as well as mixtures of two or more of the new compounds can be used. However, the compounds wherein the radical $R_1$ is in the para position are prefered since they are easier to prepare.

The alpha-phenylindole derivatives or a mixture of these derivatives will generally be used in a molar amount corresponding to the amounts of non-substituted alpha-phenylindole normally used in known stabilisation formulations, that is to say with an absolute value of 0.05–1 part by weight, or more precisely 0.1 to 0.8 part by weight, per 100 parts by weight of vinyl resin. These amounts correspond respectively to from about 0.00025 to about 0.0052 mole and to from about 0.00052 to about 0.0041 mole per 100 parts by weight of resin, whatever the alpha-phenylindole envisaged.

In addition to the stabiliser, the stabilised vinyl resin compositions may contain other ingredients, such as agents intended to improve the mechanical properties of the resin, agents facilitating the processing of the compositions, lubricants, pigments, etc.

By vinyl resin are understood not only the homopolymers of vinyl chloride, but also copolymers based on vinyl chloride with monomers such as vinyl acetate and vinyl propionate, alkyl acrylates, vinylidene chloride, acrylonitrile, styrene, vinyl and vinylidene fluorides, olefins such as ethylene and propylene, etc. Superchlorinated vinyl chloride polymers and copolymers and copolymers based on vinylidene chloride may also form part of the compositions.

Vinyl chloride polymer compositions stabilised with the aid of systems containing alpha-phenylindole derivatives according to the invention are particularly suitable for the production of packing materials for foodstuffs with the aid of machines working at a high rate, as is the case particularly in the extrusion and blow-forming of bottles for bottling mineral waters.

Various formulae based on polyvinyl chloride stabilised by a system using alpha-phenylindole (by way of comparison) and each of the derivatives whose preparation is described in Examples 1 to 4 were prepared.

The compositions prepared are described in the Table below, which also shows thermostability data for each composition.

These data are determined by a test consisting in kneading the compositions in a kneader having two cylinders heated to a temperature of 190°C, the linear speeds of the cylinders being controlled in the ratio 1,2. These temperature conditions correspond to the thermal stresses undergone by the material during processing, for example by extrusion.

For each sample it is noted after what period of time the composition assumes a yellow and then a black coloration.

The quantities of the various ingredients are expressed in parts by weight.

Examination of the Table shows that each composition retains its initial coloration after a kneading time (5 minutes) corresponding approximately to the residence time of the material in the processing apparatus. Furthermore, it can be seen that from the point of view of effectiveness the alpha-phenylindole derivatives forming the object of the present invention are equally good stabilisers as unsubstituted alpha-phenylindole provided that a molar amount thereof is used which corresponds to the amounts of alpha-phenylindole generally used.

Furthermore, by means of the compositions described bottles were produced by blow extrusion at 190° – 220°C.

During this operation, the volatility of the alpha-phenylindole derivative, in the factory, is determined. In order to do this, the same amount of air is taken off by suction on the discharge of the parisons. This air is bubbled into alcohol in containers cooled to -70°C. The alpha-phenol derivative contained in the air is dissolved in the alcohol and is then determined. From the results it is seen that the alpha-phenylindole derivatives according to the invention are substantially less volatile than unsubstituted alpha-phenylindole.

The bottles produced are filled with water and then stored at 45°C for 30 days. The solubility of the alpha-phenylindole derivative in water after bottling is then determined. The test consists in treating in each case 10 litres of water, in fractions of 2 litres, with 100 ml normal heptane. The solution obtained is concentrated to a few ml (2 or 3) and then this sample is examined by thin layer chromatography, which makes it possible to measure the amount of aplpha-phenylindole derivative dissolved, which is then referred to 1 litre of water. The results obtained also show the superiority of the alpha-phenylindole derivatives according to the invention over unsubstituted alpha-phenylindole

TABLE

| Compositions | Test No. 1 | 2 | 3 | 4 | 5 | 6 | 7 | 8 | 9 | 10 | 11 |
|---|---|---|---|---|---|---|---|---|---|---|---|
| Suspension type polyvinyl chloride, K number in 1,2-dichloroethane equal to 53 | 100 | 100 | 100 | 100 | 100 | 100 | 100 | 100 | 100 | 100 | 100 |
| Acrylic modifier | — | — | — | — | — | — | 2 | 2 | 2 | — | — |
| Polyethylene wax | — | — | — | — | — | — | 0.1 | 0.1 | 0.1 | — | — |
| Glycerol ester | 2 | 2 | 2 | 2 | 2 | 2 | — | — | — | 2 | 2 |
| Epoxidised soya oil | 3 | 3 | 3 | 3 | 3 | 3 | — | — | — | 3 | 3 |
| Calcium stearate | 0.2 | 0.2 | 0.2 | 0.2 | 0.2 | 0.2 | — | — | — | 0.2 | 0.2 |
| Zinc ethylhexoate | 0.15 | 0.15 | 0.15 | 0.15 | 0.15 | 0.15 | — | — | — | — | — |
| Tin dioctylmaleate | — | — | — | — | — | — | 1.5 | 1.5 | 1.5 | — | — |
| Alpha-phenylindole | 0.25 | 0.45 | — | — | — | — | 0.3 | — | — | — | — |
| Alpha-(para-octylphenyl)indole | — | — | 0.45 | 0.6 | — | — | — | 0.4 | — | — | — |
| Alpha-(para-dodecylphenyl)indole | — | — | — | — | 0.45 | 0.8 | — | — | 0.55 | — | — |
| Alpha-(para-tert-amylphenyl)indole | — | — | — | — | — | — | — | — | — | 0.6 | — |
| Alpha-(para-cyclohexylphenyl)indole | — | — | — | — | — | — | — | — | — | — | 0.6 |

TABLE

| | | Test No. | 1 | 2 | 3 | 4 | 5 | 6 | 7 | 8 | 9 | 10 | 11 |
|---|---|---|---|---|---|---|---|---|---|---|---|---|---|
| Thermostability test | | | | | | | | | | | | | |
| Dynamic thermostability in cylinder type kneader at 190°C | Coloration Colourless min Yellow after Black min | | 0 — — | 0 15 25 | 0 12 24 | 0 15 26 | 0 9 21 | 0 15 25 | 0 9 42 | 0 9 42 | 0 9 42 | 0 18 27 | 0 15 27 |

TABLE — Continued

| Test No. | 1 | 2 | 3 | 4 | 5 | 6 | 7 | 8 | 9 | 10 | 11 |
|---|---|---|---|---|---|---|---|---|---|---|---|
| Volatility of indole in factory mg/m³ | 1 | 1 | 0.02 | 0.02 | <0.02 | <0.02 | 1 | 0.02 | <0.02 | — | 0.05 |
| Solubility of indole in water after bottling mg/l | 0.07 | 0.07 | 0.0001 | 0.0001 | <0.0001 | <0.0001 | 0.07 | 0.0001 | <0.0001 | — | 0.0005 |

We claim:

1. In a thermally stabilized vinyl resin composition comprising vinyl resin and at least one thermal stabilizer distributed therein, the improvement wherein said stabilizer comprises a compound having the formula:

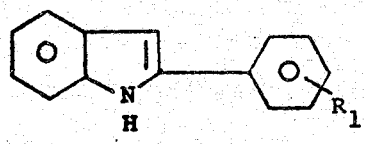

in which:

$R_1$ is a linear or branched alkyl or cycloalkyl chain containing from 4 to 20 carbon atoms, said stabilizer being present in an amount of from about 0.05 to 1 part by weight per 100 parts by weight of vinyl resin.

2. An improved stabilized vinyl resin composition according to claim 1 wherein said resin is a vinyl chloride resin.

3. An improved stabilized vinyl resin composition according to claim 2 wherein said vinyl chloride resin is selected from the group consisting of homopolymers and copolymers of vinyl chloride and copolymerizable monomer selected from the group consisting of vinyl acetate, vinyl propionate, alkyl acrylate, vinylidene chloride, acrylonitrile, styrene, vinyl fluoride, vinylidene fluoride, ethylene and propylene.

4. An improved stabilized vinyl resin composition according to claim 1 wherein said stabilizer is present in an amount of from about 0.00025 to 0.00057 moles per 100 parts by weight of resin.

5. An improved stabilized vinyl resin composition according to claim 1 wherein $R_1$ is fixed in the para position with respect to the phenyl-indole link.

6. An improved stabilized vinyl resin composition according to claim 1 wherein $R_1$ is a linear or branched alkyl or cycloalkyl chain containing from 8 to 16 carbon atoms.

* * * * *